3,056,817
ESTER SYNTHESIS
Frank X. Werber, North Royalton, and Seward J. Averill, Boston, Ohio, assignors to The B. F. Goodrich Company, New York, N.Y., a corporation of New York
No Drawing. Filed Oct. 13, 1955, Ser. No. 540,341
9 Claims. (Cl. 260—404.8)

This invention relates to a novel method for preparing esters in the presence of a titanium containing catalyst and relates more particularly to the preparation of esters by direct esterification of carboxylic acids and alcohols in liquid phase and by transesterification of esters and alcohols in liquid phase in the presence of titanium halides and hydrated titanium oxides.

Liquid phase esterification reactions involving carboxylic acids and alcohols have heretofore been catalyzed by adding to the reactants a strong mineral acid such as hydrochloric acid or sulfuric acid or aryl sulfonic acids, as well as metal salts of strong mineral acids which hydrolyze readily in the presence of water, such as zinc and tin chlorides. In liquid phase esterification reactions, sulfuric acid has been the most widely accepted commercial catalyst, since, in most applications, it effects a faster rate of ester formation and larger percent conversion of organic acid to ester than other well known esterification or transesterification catalysts.

However, acid catalysis of liquid phase esterification reactions catalyzed by sulfuric acid, as well as other strong acid catalysts, have certain disadvantages. Specifically, one disadvantage being appreciable dehydration of the alcohol ingredient, thereby substantially increasing operating costs through loss of alcohol with consequent lowering in yield of ester. Another disadvantage is that the esters obtained are strongly acid because of entrained acid. Before the esters that are suitable as plasticizers can be employed for this purpose in vinyl halide polymers, as well as other halogen containing polymers, it is necessary that the catalytic acid residue of the esters be neutralized in order to avoid accelerated degradation of the plasticized polymers that occur in the presence of free acid. The cost of protecting processing equipment employed in carrying out ester synthesis from the corrosive effect of mineral or other strong acids is yet another disadvantage of acid catalysts.

It is an object of this invention to provide a method for esterifying carboxylic acids and alcohols in liquid phase and transesterifying esters with alcohols in liquid phase under the catalytic influence of titanium halides and hydrated titanium oxides. Another object is the provision of a method for preparing esters of carboxylic acids and alcohols in liquid phase under the catalytic influence of titanium halides and hydrated oxides wherein the rate of ester formation and percent conversion of acids to esters are equivalent to or greater than those obtained when strong acid catalysts are employed. It is yet another object of this invention to provide a method for preparing esters or carboxylic acids with alcohols under the catalytic influence of titanium halides and hydrated oxides to recover substantially neutral esters that have no entrained acid. Still another object of this invention is the provision of a method for the preparation of esters of carboxylic acids with alcohols under the catalytic influence of titanium halides and hydrated oxides which effect ester synthesis without encountering catalytic dehydration of the alcoholic reactants. Other objects embodied in this invention will be apparent from the following disclosure.

Heretofore the employment of titanium compounds as catalysts of esterification reactions has been limited to contact catalysis of heterogeneous vapor phase reactions, wherein the application of the titanium compounds has been associated with surface adsorption characteristics of anhydrous titanic acid.

We have now discovered that titanium compounds having the generic formula $TiR_4$ in which R represents chlorine, bromine or an OH group can be employed in a finely divided state as a catalyst of liquid phase esterification reactions involving carboxylic acids and alcohols, and that the objects enumerated above are attained and the disadvantages overcome by the employment of the above-enumerated titanium compounds as a catalyst. The classes of titanium compounds which are included in the generic designation include hydrated titanium dioxide and titanium salts of hydrohalide acids such as $TiCl_4$ or $TiBr_4$.

Hydrated titanium dioxide that is suitable as a catalyst in accordance with this invention can be prepared by any of the well known methods employed in the art. For example, contact of titanium bearing materials, such as rutile, ilmenite or bauxite sludge with concentrated sulfuric acid, addition of a bivalent metal or its oxide, sulfate or carbonate to the acid solution to form titanium salts, and hydrolysis of the titanium salts under normal atmospheric or elevated temperatures to obtain hydrated or partially hydrated titanium dioxide gels.

Titanium dioxide gels, sometimes referred to as hydrated titanium dioxide, titanium hydroxide or orthotitanic acid, can be obtained by ammonium or alkali metal hydroxide hydrolysis of titanium salts. Preferably salts formed during the preparation of the titanium gels should be removed before addition of the gel to the carboxylic acid and alcohol or ester and alcohol reactants. The aforementioned titanium gels prepared by partially dehydrating through extraction of the available free water or by vacuum drying or heating to volatilize a portion of the water is yet another method of obtaining titanium dioxide which is an active catalyst in accordance with this invention. Hydrated titanium dioxide obtained by other well known methods in the art, such as hydrolysis of titanium halides or decomposition of titanium halides at elevated temperatures by reaction with oxygen, air and water is suitable as a catalyst in accordance with this invention. Colloidal hydrated titanium dioxide obtained by the addition of a bivalent anionic radical to an aqueous solution containing titanium dioxide or by mechanical peptization of hydrated titanium dioxide can be employed as catalysts.

The methods preferred in the preparation of hydrated titanium dioxide catalysts in accordance with this invention is that in which ammonium or alkali metal hydroxides are used to convert titanium sulfate or titanium chloride dissolved in dilute acids to a hydrated titanium dioxide gel, removing the ammonium or alkali metal salts by filtration, and washing the gel several times with water to remove substantially all of the impurities. This method is preferred because of the commercial availability of the titanium salts.

Halide salts of titanium, such as $TiCl_4$ and $TiBr_4$ are readily available and so their method of preparation requires no elaboration.

The concentration of titanium containing catalyst employed in accordance with this invention can be varied over a wide range. Preferably catalyst concentrations are from 0.01 percent to about 1.0 percent by weight based on the weight of esterifiable acid. However, amounts as high as 2.0 percent, 5.0 percent and even 10.0 percent or higher can be employed if desired.

Esterification and transesterification reactions in which titanium containing compounds of this invention can be employed as a catalyst involve the formation of esters from the interaction of carboxylic acids or carboxylic acid anhydrides and alcohols and they also include transesterification reactions in which an ester is reacted with an alcohol having a boiling point that is higher than the alcohol moiety of the esters. Consequently, this invention includes within its scope the catalyzed reactions of organic compounds containing at least one acyloxy group with an alcoholic group. In this specification and the appended claims a material having at least one acyloxy group is intended to include carboxylic acids, carboxylic acid anhydrides, and esters of carboxylic acids. The following reactions are catalyzed by hydrated titanium dioxide and titanium halides.

(1) A carboxylic acid with an alcohol to form an ester, in accordance with the general equation:

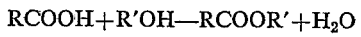

(2) Anhydrides of carboxylic acids with alcohols, in accordance with the general equation:

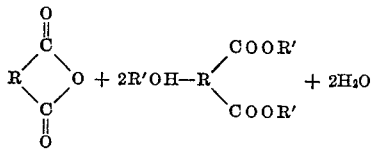

(3) Alcoholysis or transesterification reactions between esters of carboxylic acids with alcohols and other alcohols, in accordance with the general equation:

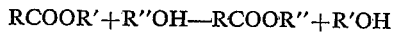

In this latter reaction the alcohol of the formula R″OH should have a higher boiling point than the alcohol which it displaces or the displaced alcohol should form an azeotrope which boils at a temperature below that of R″OH.

In all the above formulas the symbols R, R′ and R″ represent organic groups which may be aliphatic, cycloaliphatic or aromatic.

Among the carboxylic acids which can be reacted with alcohols in accordance with this invention are included, by way of example, the following classes of compounds:

Carboxylic acids of the general formula $R(COOH)_n$, wherein R is an organic radical, n is an integer. Included are such acids as acetic, hydroacetic, chloroacetic, bromoacetic, cyanoacetic, phenylacetic, triphenylacetic, propionic, halopropionic, alpha-hydroxy propionic, beta-hydroxy propionic acid, n-butyric, isobutyric, n-valeric, isovaleric, 5-phenyl-n-valeric, n-heptoic, caproic, pelargonic, lauric, palmitic, lignoceric, 5-chlorobutyric, alpha-hydroxy lignoceric, malonic, succinic, glutaric, adipic, pimelic, azelaic, sabacic, decane-1,10-dicarboxylic, pentadecane-1,15-dicarboxylic, pentacosane-1,25-dicarboxylic, 1,2,3-propanetricarboxylic (also known as tricarballylic acid) and like acids;

Acrylic, alpha-chloroacrylic, beta-chloroacrylic acid, beta-bromoacrylic acid, beta-phenyl acrylic acid, methacrylic, vinylacetic, crotonic, angelic, tiglic, undecylenic, oleic, erucic, linoleic, linolenic, maleic, fumaric, mesaconic, citraconic, glutaconic, itaconic, muconic, aconitic acid and like acids;

Cyclopropane carboxylic, cyclobutane carboxylic, cyclopentane carboxylic, cycloheptane carboxylic; cyclohexane carboxylic; 2-hydroxy cyclohexane, 1,1-cyclopropane dicarboxylic; 1,2-cyclobutane dicarboxylic; 1,3-cyclobutane dicarboxylic; 1,4-cyclohexane dicarboxylic; 1,2,3,4,5,6-cyclohexane hexacarboxylic acid and like acids;

Cyclopentene-2-carboxylic; 1-cyclohexene-1-carboxylic; hydrocarpic, cyclohexadiene-1,2-dicarboxylic, 1,3-cyclohexadiene-1,4-dicarboxylic acid and like acids;

Benzoic; o, m and p-amino benzoic; bromobenzoic; chlorobenzoic; o, m-p-hydroxybenzoic; o, m and p-nitrobenzoic acid; o, m and p-methoxy benzoic; alpha-naphthoic; beta-naphthoic; o, m and p-methyl benzoic; o, m and p-ethyl benzoic; p-benzyl benzoic; phthalic, metaphthalic, terephthalic; hydroxy phthalic; 2,3-dimethylbenzoic; benzene-1,2,4-tricarboxylic; benzene-1,3,5-tricarboxylic; benzene-1,2,4,5-tetracarboxylic acid and like acids;

Anhydrides of dibasic acids, such as succinic, glutaric, adipic, pimelic, maleic, mesaconic, citraconic, glutaconic, itaconic, phthalic and like anhydrides;

Among the alcohols which can be reacted with carboxylic acids, carboxylic acid anhydrides, and esters of carboxylic acids with alcohols, are included, by way of example, the following classes of compounds:

Alcohols of the general formula $R(OH)_n$, wherein R is an organic radical, n is an integer. These include alcohols such as methanol; chloroethanol; cyanoethanol; ethoxyethanol; phenylethanol; 2-chloro-1-propanol; 3-bromo-1-propanol; 2,2-dichloro-1-propanol; ethyl, n-propyl, isopropyl, n-butyl, sec-butyl, 2-nitro-1-propanol; 1-chloro-2-propanol; 2-nitro-1-butanol; 2-methyl-1-pentanol; 2-methyl pentanol-3; primary and secondary octanol; n-dodecanol; 6-dodecanol; lauryl, myristyl, stearyl, 2-propen-1-ol; 2-butene-1-ol; 3-pentene-1-ol and like alcohols;

Ethylene glycol, trimethylene glycol, tetramethylene glycol, pentamethylene glycol, glycerol, pentaerythritol, decane-1,10-diol; pentadecane-1,15-diol; pentacosane-1,25-diol; 2-4-hexadiene-1,6-diol; 2,4-octadiene-1,8-diol and like alcohols;

Benzyl alcohol; o, m and p-hydroxy benzyl alcohol; o, m and p-methoxy benzyl alcohol; o, m and p-nitro benzyl alcohol; o, m and p-methyl alcohol; phenylethyl alcohol; triphenylethyl alcohol; o, m and p-benzyl benzyl alcohol; alpha-naphthylethyl alcohol; beta-naphthylethyl alcohol; o, m and p-phenylene-diethyl alcohol; naphthylene-1,2-diethyl alcohol; phenylene-1,3,5-triethyl alcohol; phenylene-1,4-dioctyl alcohol and like alcohols;

Among the esters which can be reacted with alcohols in the presence of hydrated titanium dioxide or titanium halides to form esters having different alcohol moieties than those of the ester reactant are included, by way of example, the following classes of compounds:

Esters of monocarboxylic acids and monohydric alcohols of the general formula RCOOR′, wherein R and R′ are organic radicals, such as methyl acetate; ethyl chloroacetate; ethyl cyanoacetate; n-heptylacetate, methyl propionate; ethyl 2-bromobutanoate; ethyl caproate; ethyl laurate, methyl lignocerate, vinyl acetate; vinyl butyrate; vinyl benzoate; vinyl toluate; methyl methacrylate; ethyl methacrylate; hexyl acrylate, dodecyl methacrylate; isopropenyl isobutyrate; isopropenyl benzoate; isopropenyl toluate, methyl benzoate, ethyl benzoate; methyl cyclohexoate; ethyl cyclohexoate; ethyl hydroxyacetate, vinyl beta-hydroxypropionate and the like as well as esters of monocarboxylic acids and polyhydric alcohols of the general formula $R(OOCR')_n$, wherein R and R′ are organic radicals, n is an integer greater than one, such as ethylene 1,2-diacetate; ethylene 1,1-diacetate; ethylene 1,2-dipropionate; ethylene 1,2-dioctanoates; ethylene 1,2-dilaurate; ethylene 1,2-dipalmitate; ethylene 1,2-diacrylate, ethylene 1,2-dimethacrylate; ethylene 1,2-dicyclohexoate; ethylene 1,2-dibenzoate; ethylene 1,2-ditoluate; 2,4-hexadiene-1,6-diacetate; pentaerythritol tetraacetate; ethylene 1,2-ditiglate, trimethylene 1,3-dilinoleate; glyceryl diacetate; glyceryl dihexoate; glyceryl dipalmitate; glyceryl dibenzoate; glyceryl triacetate; glyceryl tributyrate; glyceryl tribenzoate; glyceryl trioleate and the like.

Included under the general formula $R(COOR')_n$, wherein R and R′ are organic radicals, n is an integer greater than one, are esters of polycarboxylic acids and monohydric alcohols, such as dimethyl malonate; diethyl malonate; dodecyl malonate; dimethyl succinate; diethyl glutarate; dibutyl azelate; dimethyl cyclopropane-1,1-dicarboxylate; dimethyl cyclohexane-1,4-dicarboxylate; dimethyl maleate; diethyl maleate; dioctyl maleate; dimethyl fumarate; diethyl fumarate; dimethyl citraconate; dimethyl glutaconate; trimethyl aconitate; triethyl aconitate; dimethyl benzene-1,2-dicarboxylate; o, m and p-phenylene diacetate and the like.

Reaction conditions such as temperature, pressure and proportions can be varied widely and in the main will depend on the individual reactants and end products desired, but the reactants must be maintained in a liquid phase. Although the reactions will proceed slowly at room temperature, it is preferred to operate at elevated temperatures, particularly under reflux, because of the markedly greater reaction rate. To facilitate the completion of the reaction, continuous or intermittent removal of one or more of the reaction products can be effected by means well known in the art. They include carrying out the reactions in the presence of diluents which form azeotropic mixtures which boil at a temperature below that of one of the desired end products, by removal of an undesired by-product or by removal of the desired end product, by passing superheated steam or inert gases such as nitrogen through the reaction medium to strip out one of the reaction products, or by carrying out the reactions at reduced or elevated pressures.

The following examples are intended to illustrate the methods of preparing esters in the presence of a hydrated titanium dioxide or titanium halide catalyst, and the efficiency of titanium containing catalysts. Although the examples are specific, it is not intended that the scope of this invention be limited thereto, since other methods will be apparent to those skilled in the art. All parts are by weight unless otherwise indicated.

Example I

A glass flask fitted with a reflux condenser and an alcohol displacement water separator was charged with 420 parts of octanol-2, 148 parts of phthalic anhydride and 40 parts of hydrated titanium dioxide gel containing about 5% $TiO_2$ and 95% water. The charge was heated to reflux temperature which was maintained until 99.0 percent of the phthalic anhydride was converted to di-(2-octyl) phthalate. Water was continuously removed throughout the course of the reaction. For control purposes, a similar reaction was carried out without a catalyst.

The hydrated titanium oxide gel was prepared by dissolving titanium tetrachloride in water, and hydrolyzing by adding sufficient $NH_4OH$ to the solution to precipitate hydrated titanic acid or hydrated titanium dioxide gel. The resulting precipitated gel was filtered free of the aqueous medium containing dissolved $NH_4Cl$ and washed several times with water until no trace of chloride ion was detected.

Amounts of the same alcohol and anhydride with 2 grams of p-toluene sulfonic acid as the catalyst was also reacted.

Set out in the following table are the data obtained showing the catalyst, the percent acid esterified in the designated time and the percent alcohol dehydrated.

| Catalyst | Percent Esterification of Acid | Time in Hours | Percent Excess Alcohol Dehydrated |
|---|---|---|---|
| None | 90 | 37 | 10% after 37 hours. |
| Percent $TiO_2$ | 99 | 13 | 15% after 13 hours. |
| Sulfonic acid p-toluene | 93 | 6 | 92% after 6 hours. |

When p-toluene sulfonic acid is used as the catalyst it is very difficult to attain 99% esterification of the acid without a very excessive loss of alcohol through dehydration. When no catalyst is used the latter stages of esterification are extremely slow, so that a very prolonged reaction period is needed to reach 99% esterification of the acid.

Example II

A glass flask fitted with a reflux condenser, a stirrer and an alcohol displacement water separator was charged with 148 parts of phthalic anhydride, 390 parts of 2-ethyl hexanol and 40 grams of a hydrated titanium dioxide gel catalyst having about 5% $TiO_2$. The charge was heated to reflux temperatures and maintained thereat until 99.0 percent of the phthalic anhydride was converted to di-(2-ethylhexyl) phthalate. Water was continuously removed throughout the course of the reaction. The acid was 99% esterified in slightly more than one hour.

Examples III to VII

The titanium dioxides employed as catalysts in Examples 3 and 4, which follow, were prepared in gel form from commercial titanium sulfate containing the equivalent of about 50% titanium sulfate, 25% sulfuric acid and 25% water. The titanium salt was hydrolyzed with $NH_4OH$ to form a hydrated titanium dioxide gel which was washed with water until no sulfate ion was detectable in the filtrate. The hydrated titanium dioxide catalysts employed in Examples 5, 6 and 7 were prepared as follows: Example 5; titanium dioxide in gel form, having a calculated $TiO_2$ concentration of 18.1% by weight, obtained by hydrolysis of titanium sulfate was dried at 120° C. for 1.5 hours. Example 6; titanium dioxide in gel form obtained by hydrolysis of titanium sulfate was dried in vacuo at 80° F. resulting in the recovery of a moist powder which when dispersed in water with agitation would not return to a gel state. The $TiO_2$ concentration of the moist powder analyzed 76% by weight. Example 7; titanium dioxide in gel form obtained by hydrolysis of titanium sulfate was dehydrated by heating at 350° C. for 2 hours resulting in the recovery of substantially anhydrous powdered $TiO_2$.

In each case one mole of phthalic anhydride was reacted with 3 moles of 2-ethyl hexanol at reflux temperature. The amount of catalyst was regulated to be equivalent to 2 grams of $TiO_2$ on a dry basis.

Set out in the following table are the data showing the catalyst and the total elapsed time required to convert 99 percent of phthalic anhydride to di-(2-ethylhexyl) phthalate.

| Example | Catalyst Conc. | Time to Convert 99% of the Acid to Diester |
|---|---|---|
| Control | None | 19.0 hours (about 90% ester). |
| III | $TiO_2$ (4 to 5% $TiO_2$ wt.) | 1.83 hours. |
| IV | $TiO_2$ gel (10% $TiO_2$ by wt.) | 1.83 to 2.00 hours. |
| V | $TiO_2$ gel (18% $TiO_2$ by wt.) | 2.50 hours. |
| VI | $TiO_2$ moist powder (76% $TiO_2$ by wt.). | 4.66 hours. |
| VII | $TiO_2$ anhydrous powder (100% $TiO_2$ by wt.). | 19.0 hours (about 90% ester). |

The foregoing examples illustrate the fact that catalytic activity or efficiency of hydrated titanium oxides obtained in an agglomerate gel state exhibit the highest degree of catalytic efficiency, and that the catalytic efficiency of titanium oxides in a gel state is reduced as water content of the gels is reduced. The foregoing examples also illustrate the fact that even though the titanium oxide gels are dehydrated to the extent where the characteristic gel form is converted to that of a moist powder (Example VI), it still retains some catalytic activity so long as it is not completely dehydrated.

The exact reason why titanium oxide gels having about 4 to 5 percent calculated $TiO_2$ by weight combined with water exhibit higher catalyst efficiency than partially dehydrated or completely dehydrated titanium oxide gels is not known. It is believed that the finely divided state of $TiO_2$ obtained by precipitation of titanium from an aqueous medium to form a characteristic elastic gel results in the formation of $TiO_2$ aggregates which are readily dissolved or highly dispersed in an organic medium, and that the reduction or lack of catalytic efficiency exhibited by partially dehydrated or completely dehydrated titanium oxide gel is due to formation of larger $TiO_2$ aggregates and not to removal of water, per se, since very long aging without loss of water will produce the same type of aggregation. Conversely, a fresh titanium dioxide gel with small particle size and high TiO₂ content has high catalytic activity.

*Example VIII*

A mixture was made of 142 parts (0.55 mole) dibutyl adipate, 45 parts (0.50 mole) butanediol-1,3 and 2.85 parts of titanium dioxide gel prepared from titanium sulfate cake by hydrolysis and neutralization. The final titanium dioxide gel consisted of 30 to 40% TiO₂ and 60–70% water. These ingredients were added to a 3 necked flask having attached thereto a reflux column packed with Berl saddles. The reaction was carried out by the application of heat to the reaction mixture until a temperature of 196° C. was reached and thereafter slowly cooled to a temperature of 172° C. with the continuous removal of butanol. After 3 hours, 37 parts of butanol were collected. The pressure was slowly dropped during a period of 1.5 hours to a pressure of 40 mm. Heating was continued during the time that the pressure was reduced and an additional 16 parts of butanol were collected.

A reaction product, a polyester, was obtained in the form of a viscous oil. Analysis of the oil revealed that the polyester had a hydroxyl content of 1%. The initial reaction mixture had a hydroxyl content of 18%. From this analysis there was concluded that 95% of the available diol was transesterified to form the polyester.

A reaction mixture analogous to that described excepting that no hydrated titanium dioxide gel was included therein was treated in the same manner. A negligible amount of butanol was obtained indicating that no transesterification was effected.

When terephthalic acid and ethylene glycol are reacted in the presence of either the hydrated titanium dioxide, titanium tetrachloride or titanium tetrabromide a high molecular weight, solid, high melting polymer is formed.

*Example IX*

This example illustrates polyester synthesis by direct esterification methods in the presence of titanium dioxide gel. 146 parts of adipic acid, 113 parts of butanediol-1,3, 10 parts of lauric acid, and 40 parts of titanium dioxide gel containing 4–5% TiO₂, the latter prepared as described in the foregoing Example VIII, were reacted for 40 minutes at atmospheric pressure at temperatures from 148 to 250° C. 65 parts of water were collected. This included about 30 to 35 ml. displaced from the titanium dioxide gel. The reaction mixture was then heated at 100 mm. pressure for about 1.5 hours at 167 to 205° C. An additional 10 ml. of water were collected during this heating step. The product on analysis was found to have an acid number of 6.3. The acid number of the starting materials was 428.

Dimethyl terephthalate can also be transesterified with a glycol. If the glycol is ethylene glycol a high molecular weight solid polymer results. With higher molecular weight glycols the polyester that forms can be liquid or a low melting solid.

*Example X*

A mixture of 148 parts of phthalic anhydride, 390 parts of 2-ethyl hexanol and 1.4 parts of titanium tetrachloride was reacted under reflux for about one hour. Water was removed by entrapment about as rapidly as it was formed. At the end of this period 99% of the phthalic anhydride was converted to di-2-ethyl hexyl phthalate. The esterification proceeds quite rapidly, so that at the end of slightly more than a half hour about 88.4% of the carboxyl groups were esterified.

*Example XI*

Secondary alcohols can be esterified with little or no dehydration of the alcohol. A mixture of 148 parts of phthalic anhydride, 390 parts of octanol-2 and 1.9 parts of titanium tetrachloride was heated to the reflux temperature. The time required for esterifying phthalic anhydride to 99% was slightly more than 8 hours. This is considerably longer than that required to esterify primary alcohols, but even under these conditions of prolonged exposure to heat, less than 5% of the octanol-2 was dehydrated. Equally effective results are obtained if titanium chloride is replaced by titanium bromide.

In a copending application Serial No. 540,342 filed on October 13, 1955, by Frank X. Werber, there are described methods of preparing esters of alcohols and carboxylic acids by the use of alkyl titanates, acyl titanates and titanium chelates of polyols or amino alcohols as catalysts.

Although we have described this invention by reference to specific examples, these are meant to be illustrative of the procedures that can be employed and are not to be construed as limitations. Accordingly, the invention is intended to include all the variations and modifications falling within the spirit and scope of the claims.

We claim:

1. A method of preparing esters comprising reacting an unsubstituted carboxylic acid and a primary alcohol in liquid phase and at an elevated temperature in the presence of from about 0.01 to about 10% by weight based on said acid of a hydrated titanium dioxide and removing water from the reaction mixture substantially as rapidly as it is formed.

2. A method of preparing esters comprising reacting an acid anhydride with primary and secondary alcohols, in liquid phase, and at an elevated temperature in the presence of from about 0.01 to about 10% by weight based on said anhydride of a hydrated titanium dioxide and removing water from the reaction mixture substantially as rapidly as it is formed.

3. A method of preparing polyester comprising reacting an unsubstituted polycarboxylic acid and a polyhydric alcohol, in liquid phase at an elevated temperature in the presence of from about 0.01 to about 10% based on the weight of said acid of hydrated titanium dioxide, and removing water from the reaction mixture substantially as rapidly as it is formed.

4. A method of preparing polyethylene glycol terephthalate comprising reacting terephthalic acid and ethylene glycol in liquid phase at an elevated temperature in the presence of from about 0.01 to about 10% by weight based on the terephthalic acid of hydrated titanium dioxide, and removing water from the reaction mixture substantially as rapidly as it is formed.

5. A method of preparing di(2-ethyl hexyl) phthalate comprising reacting phthalic anhydride with 2-ethyl hexanol in liquid phase at an elevated temperature in the presence of from 0.01 to about 10% by weight based on the anhydride of hydrated titanium dioxide and removing water from the reaction mixture substantially as rapidly as it is formed.

6. A method of preparing di(2-octyl) phthalate comprising reacting phthalic anhydride with octanol-2 in liquid phase at an elevated temperature in the presence of from about 0.01 to about 10% by weight based on the anhydride of hydrated titanium dioxide as a catalyst and removing water from the reaction substantially as rapidly as it is formed.

7. A method of preparing polyesters comprising reacting in liquid phase at an elevated temperature adipic acid, 1,3-butanediol and a small amount of lauric acid in liquid phase in the presence of from about 0.01 to about 10% by weight based on said acids of hydrated titanium dioxide and removing water from the reaction substantially as rapidly as it is formed.

8. A method of preparing a polyester comprising reacting in liquid phase at an elevated temperature dibutyl adipate and 1,3-butanediol in the presence of from about 0.01 to about 10% by weight based on the adipic acid moiety of the dibutyl adipate of hydrated titanium dioxide and removing the butanol and water from the reaction substantially as rapidly as they form.

9. A method of preparing esters comprising reacting in liquid phase and at an elevated temperature (1) a member selected from the class consisting of (A) carboxylic acids and primary and secondary alcohols, (B) anhydrides of carboxylic acids and primary and secondary alcohols, and (C) esters of carboxylic acids and alcohols with primary and secondary alcohols different from those in the ester, said carboxylic acids, anhydrides, esters, primary and secondary alcohols containing only carbon, hydrogen and oxygen in the presence of from about 0.1 to about 10% based on the acid component in (A), (B), (C) group with (2) hydrated titanium dioxide, and removing water from the reaction mixture substantially as rapidly as it is formed.

References Cited in the file of this patent

UNITED STATES PATENTS 2,729,619     Sullivan _____ Jan. 3, 1956